US012106713B2

(12) United States Patent
Choi et al.

(10) Patent No.: US 12,106,713 B2
(45) Date of Patent: Oct. 1, 2024

(54) DISPLAY DEVICE WITH REDUCED ROUNDED CORNER BEZEL SIZE

(71) Applicant: Google LLC, Mountain View, CA (US)

(72) Inventors: Sangmoo Choi, Mountain View, CA (US); Jungmin Han, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/995,792

(22) PCT Filed: Nov. 3, 2020

(86) PCT No.: PCT/US2020/058702
§ 371 (c)(1),
(2) Date: Oct. 7, 2022

(87) PCT Pub. No.: WO2022/098343
PCT Pub. Date: May 12, 2022

(65) Prior Publication Data

US 2023/0162680 A1 May 25, 2023

(51) Int. Cl.
*G09G 3/3233* (2016.01)
*G09G 3/3258* (2016.01)

(52) U.S. Cl.
CPC ......... *G09G 3/3233* (2013.01); *G09G 3/3258* (2013.01); *G09G 2300/0426* (2013.01);
(Continued)

(58) Field of Classification Search
None
See application file for complete search history.

(56) References Cited

U.S. PATENT DOCUMENTS

2011/0025659 A1 2/2011 Won-Kyu et al.
2016/0027380 A1* 1/2016 Kim .................... G09G 3/3233 315/172

(Continued)

FOREIGN PATENT DOCUMENTS

KR 20160013359 A 2/2016
KR 20180098466 A 9/2018

OTHER PUBLICATIONS

International Search Report and Written Opinion from International Application No. PCT/US2020/058702, dated Jul. 9, 2021, 15 pp.

(Continued)

*Primary Examiner* — Matthew Yeung
(74) *Attorney, Agent, or Firm* — Shumaker & Sieffert, P.A.

(57) ABSTRACT

A device includes a display panel with a first end, a second end, a first side, and a second side. The display panel includes a rounded corner region located between the first end and the first side and a plurality of pixel circuits. The plurality of pixel circuits includes a first set of pixel circuits ending in the rounded corner region and a second set of pixel circuits ending in a straight region adjacent to the rounded corner region, the straight region located on the first side of the display panel. A voltage supply bus is configured to carry an electrical signal along the rounded corner region and the straight region. A supplementary voltage supply bus, electrically connected to the voltage supply bus, is configured to carry the electrical signal to the plurality of the first set of pixel circuits in the rounded corner region.

18 Claims, 10 Drawing Sheets

(52) U.S. Cl.
CPC ............... *G09G 2300/0819* (2013.01); *G09G 2300/0842* (2013.01); *G09G 2310/062* (2013.01)

(56) References Cited

U.S. PATENT DOCUMENTS

| | | | | |
|---|---|---|---|---|
| 2018/0247582 | A1* | 8/2018 | Park | G06F 1/1626 |
| 2020/0286432 | A1* | 9/2020 | Zhang | G09G 3/3266 |
| 2020/0303421 | A1* | 9/2020 | Cho | H01L 29/7869 |

OTHER PUBLICATIONS

International Preliminary Report on Patentability from International Application No. PCT/US2020/058702 dated May 19, 2023, 10 pp.
Response to Communication Pursuant to Rules 161(1) and 162 EPC dated May 11, 2023, from counterpart European Application No. 20817544.8, filed Nov. 17, 2023, 11 pp.
Office Action from counterpart Korean Application No. 10-2023-7016875 dated Mar. 31, 2024, 13 pp.

* cited by examiner

DISPLAY DEVICE WITH REDUCED ROUNDED CORNER BEZEL SIZE

BACKGROUND

Computing devices may include display panels and light emitting elements that generate light using electrical energy. In general, computing devices may include a gap between the display panel outline and the display active area outline. This gap may be referred to as a bezel. A gap between the display panel outline and the display active area may increase the size of the bezel of the device, commonly referred to as a display panel bezel. To improve the aesthetic appeal of their computing devices, manufacturers of computing devices have made various attempts to reduce the display panel bezel size including the bezel at the rounded corners.

SUMMARY

This disclosure generally relates to display devices, and more particularly to display devices with reduced rounded corner bezel size. In general, a display of a display device includes an active area comprising rows of pixels (e.g., pixel circuits). During operation pixel circuits may receive an initialization voltage to facilitate programming of emission levels of the pixel circuits. The initialization voltage may be delivered to the pixel circuits via a voltage supply bus. For instance, each row of pixel circuits of a plurality of rows of pixel circuits may be connected to a respective trace of a plurality of traces that are each directly connected to the voltage supply bus. However, using a separate trace for each row of pixel circuits may present one or more disadvantages. For instance, where the display includes a rounded corner region, using a separate connection between each trace and the voltage supply bus may result in an increase in a bezel size at the rounded corner region, which may be undesirable. Additionally or alternatively, such a configuration may make it difficult to decrease the bezel size at the rounded corner region.

In accordance with one or more aspects of this disclosure, a display device may include a supplementary voltage supply bus that connects traces of a plurality of rows of pixel circuits to the voltage supply bus. For instance, the supplementary voltage supply bus may form a connection adjacent to the rows of pixel circuits between the voltage supply bus and rows of pixel circuits in the rounded corner region. Such a configuration may avoid the display device needing to include an independent/separate row-by-row connection between the voltage supply bus and each row of pixel circuits in the rounded corner region. In this way, the bezel size of the rounded corner region may be decreased, which may be desirable.

As one example, a device may include a display panel with a first end, a second end, a first side, and a second side. The display panel may include a rounded corner region located between the first end and the first side of the display panel. The display panel may further include a plurality of pixel circuits including a first set of pixel circuits ending in the rounded corner region and a second set of pixel circuits ending in a straight region adjacent to the rounded corner region, the straight region located on the first side of the display panel. The device may further include a voltage supply bus configured to carry an electrical signal along the rounded corner region and the straight region. The device may further include a supplementary voltage supply bus, electrically connected to the voltage supply bus, configured to carry the electrical signal to the plurality of the first set of pixel circuits in the rounded corner region.

In some examples, the device may include a display that is an active matrix organic light emitting diode ("AMOLED") display, and wherein the electrical signal is an initialization voltage signal used to program emission levels of pixel circuits of the plurality of pixel circuits in the rounded corner region. In some examples, the voltage supply bus may be within 200 μm of a pixel in any row of pixel circuits in the rounded corner region. In some examples, the supplementary voltage supply bus may include an anode metal layer.

The details of one or more examples are set forth in the accompanying drawings and the description below. Other features, objects, and advantages will be apparent from the description and drawings, and from the claims.

BRIEF DESCRIPTION OF DRAWINGS

The following description should be read with reference to the drawings wherein like reference numerals indicate like elements throughout the several views. The drawings and description show several embodiments which are meant to be illustrative of the disclosure.

DETAILED DESCRIPTION

Figure 1A:
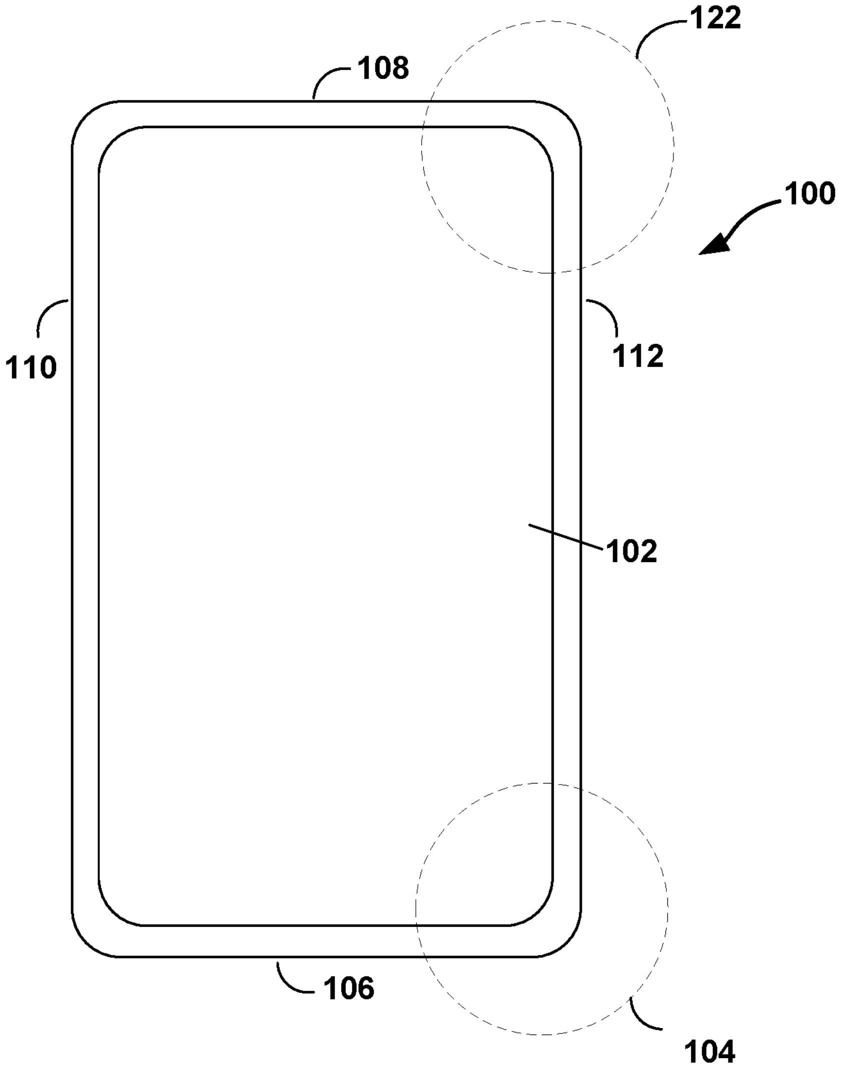
FIG. 1A is a conceptual diagram illustrating a display device and a rounded corner region.

FIG. 1A is a diagram illustrating an example display panel 100. As illustrated by the example of FIG. 1A, a display panel 100 may include display panel active area 102, which may include rounded corner region 104. Display panel 100 may be included in a computing device. Examples of such a computing device include, but are not limited to, a mobile phone, a camera device, a smart display, a tablet computer, a laptop computer, a desktop computer, a gaming system, a media player, an e-book reader, a television platform, a vehicle infotainment system or head unit, or a wearable computing device (e.g., a computerized watch, a head mounted device such as a VR/AR headset, computerized eyewear, a computerized glove). Examples of display panel 100 include, but are not limited to, liquid crystal displays (LCD), light emitting diode (LED) displays, organic light-emitting diode (OLED) displays, active matrix organic light emitting diode ("AMOLED") displays, microLED displays, or similar monochrome or color displays capable of outputting visible information to a user of display panel 100.

As illustrated by the example of FIG. 1A, the display panel active area 102 may include a first end 106, a second end 108, a first side 110, and a second side 112. Rounded corner region 104 may be located on or near the first end 106 of the display panel active area 102. For instance, as shown in FIG. 1A, rounded corner region 104 may be located between first end 106 and second side 112. Although the example of FIG. 1A illustrates a display panel comprising first end 106, second end 108, first side 110, and second side 112, it should be apparent that techniques of this disclosure may also be applied to display panels having different geometries. For instance, the techniques of this disclosure are applicable to round display panels and display panels having more than two ends and/or two sides. Further, although the example of FIG. 1A illustrates rounded corner region 104 located between first end 106 and second side 112, it should be apparent that techniques of this disclosure may also be applied to a rounded corner region located between another end and another side of a display panel. For example, a rounded corner region may be located between the first end and the first side of the display panel, the second end and the first side of the display panel, and/or the second end and the second side of the display panel.

As discussed in further detail below, a display panel active area 102 may include an array of pixel circuits that are divided into rows and columns. Operation of the pixel circuits may be controlled using electrical signals relayed via a plurality of traces (e.g., pixel circuit traces) built into display panel 100. For instance, a plurality of pixel circuits (e.g., located on the same row) may share a common trace (e.g., a single pixel circuit trace) that carries an initialization voltage signal. These pixel circuit traces, when used to carry an initialization voltage signal, may be referred to as initialization traces. A signal supply bus may run parallel to the columns of pixel circuits and each of the pixel circuit traces may connect directly to the voltage supply bus. However, pixel circuit traces that connect directly to the voltage supply bus may need to occupy a large amount of area in rounded corner region 104. In general, to accommodate these pixel circuit traces connected directly to the voltage supply bus, display panel bezel size, including the bezel size in rounded corner region 104, may be increased and/or the display corner curvature may be modified. However, increasing display panel bezel size and/or modifying the display corner curvature may be undesirable (e.g., due to aesthetic considerations).

In accordance with one or more aspects of this disclosure, display panels with rounded corners may accommodate the pixel circuit traces between the rows of pixel circuits and the voltage supply bus in the rounded corner region of a display without significantly increasing display panel bezel size. For instance, as discussed in further detail below, display panel may include a supplementary voltage supply bus adjacent to the rows of pixel circuits, electrically connected to the voltage supply bus, configured to carry the electrical signal to a plurality of pixel circuits in the rounded corner region, thereby reducing the area occupied by pixel circuit traces in the rounded corner region and allowing for the reduction of display panel bezel size. In this way, display panel 100 may omit a separate independent connection between each of the rows of pixel circuits in the rounded corner region and the voltage supply bus.

Figure 1B:
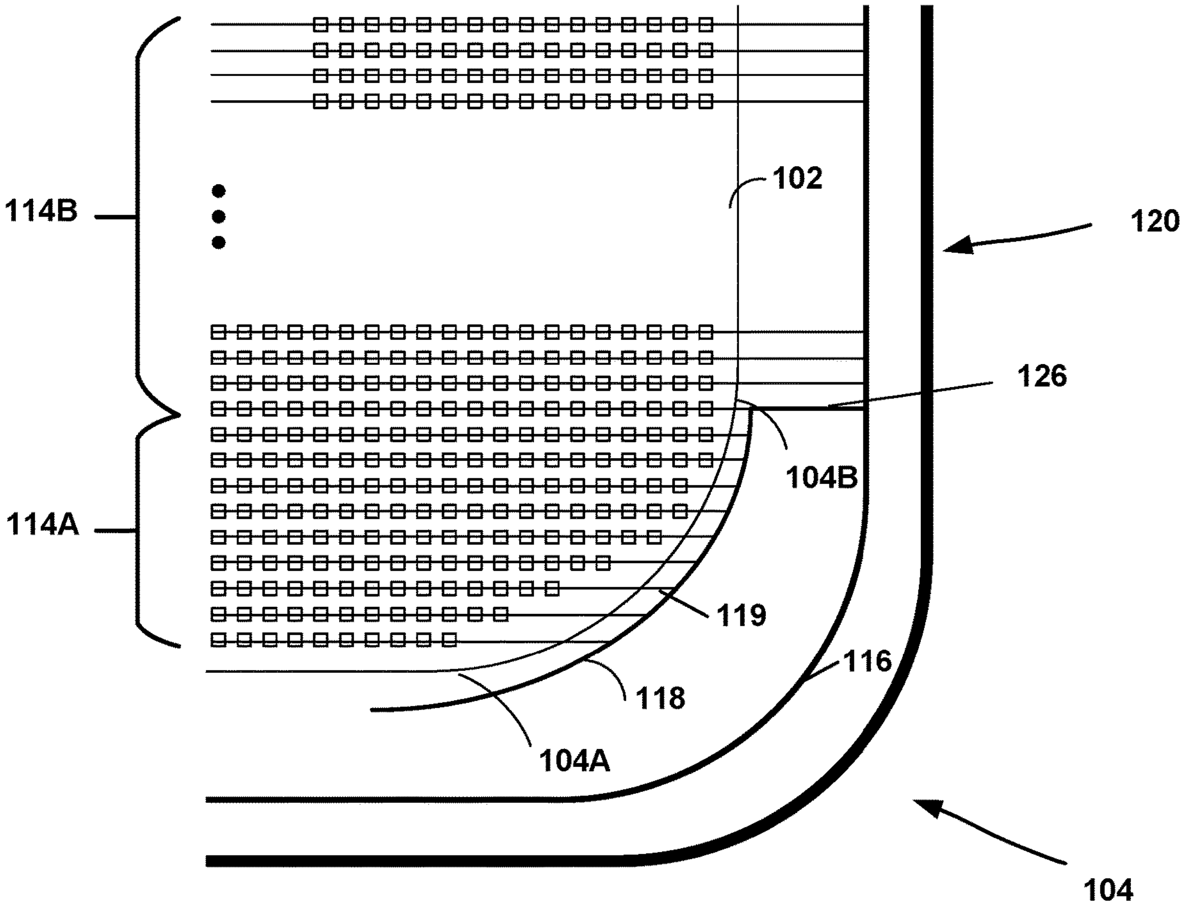
FIG. 1B is a conceptual diagram illustrating, in more detail, an enlarged rounded corner region in accordance with aspects of this disclosure.

FIG. 1B is a diagram illustrating an enlarged example of a rounded corner region 104. As shown in FIG. 1B, rounded corner region 104 may be located between first end 106 and second side 112 of display panel 100. However, rounded corner region 104 may be located between another end and another side of display panel 100 (e.g., first end 106 and first side 110). As illustrated by the example of FIG. 1B, display panel 100 may further include a plurality of pixel circuits 114, a voltage supply bus 116, and a supplementary voltage supply bus 118. Together, pixel circuits 114 may constitute at least part of display panel active area 102. Pixel circuits 114 may receive an initialization voltage to program emission levels of pixel circuits 114 from a voltage supply bus 116 configured to carry an electrical signal to pixel circuits 114. Pixel circuits 114 may include a first set of pixel circuits 114A ending in rounded corner region 104 and a second set of pixel circuits 114B ending in a straight region 120 adjacent to rounded corner region 104. For example, plurality of pixel circuits 114 may include a first set of pixel circuits 114A, the last pixel in first row of pixel circuit of first set of pixel circuits 114A being at a first terminal point of rounded corner 104A of rounded corner region 104, and the last pixel in last row of pixel circuit of first set of pixel circuits 114A being at a second terminal point of rounded corner 104B adjacent to a first terminal point of straight region 120, straight region being adjacent to rounded corner region 104. Additionally or alternatively, plurality of pixel circuits 114 may include a second set of pixel circuits 114B, the last pixel in first row of pixel circuit of second set of pixel circuits 114B being at a first terminal point of straight region 120 adjacent to second terminal point of rounded corner 104B, and the last pixel in last row pixel circuit of second set of pixel circuits being at a second terminal point of straight region 120.

The voltage supply bus 116 may be configured to carry an electrical signal along the rounded corner region 104 and the straight region 120. The electrical signal may originate from an initialization voltage source (e.g., DC voltage source), to which the voltage supply bus may be electrically connected. Examples of voltage supply busses 116 include, but are not limited to, a connection comprising a conductive layer. Conductive materials comprised in the conductive layer may include, but are not limited to, copper, nickel, silver, gold, aluminum, metal alloys, and other suitable conductive materials.

Supplementary voltage supply bus 118, electrically connected to the voltage supply bus 116, may be configured to carry the electrical signal to the plurality of the first set of pixel circuits 114A in the rounded corner region 104 electrically connected to supplementary voltage supply bus 118. In some examples, supplementary voltage supply bus 118 may possess a curvature that allows the length of supplementary voltage supply bus 118 to be substantially adjacent to one or more pixel circuits of the first set of pixel circuits 114A that is on or near the perimeter of rounded corner region 104.

By configuring supplementary voltage supply bus 118 to carry the electrical signal to the plurality of the first set of pixel circuits 114A in the rounded corner region 104, the area occupied by pixel circuit traces 119 (i.e., connections configured to carry an electrical signal between the pixel circuits 114 and voltage supply bus 116 or supplementary voltage supply bus 118) may be reduced, resulting in space in the bezel region of rounded corner region 104 for other structures (e.g., signal/power lines, integrated row driver circuit, etc.), in turn allowing for the display panel bezel size to be decreased. In some examples, voltage supply bus 116 may be electrically connected to a DC initialization voltage source, and supplementary voltage supply bus 118 may be used to carry an electrical signal from the voltage supply bus 116 to the plurality of the first set of pixel circuits 114A in the rounded corner region 104 electrically connected to supplementary voltage supply bus 118 via a connection 126.

In general, pixel circuit initialization voltage sources may be used to initialize one row at a time in a matrix addressing display, so the current driving capability of supplementary voltage supply bus 118 in such a scenario may be relatively low (e.g., compared to the current driving capability of supplementary voltage supply bus 118 required in a device with a pixel circuit initialization voltage sources that is used to initialize multiple rows at a time in a matrix addressing display). As such, supplementary voltage supply bus 118 may be electrically connected to voltage supply bus via a single connection 126. Thus, in some examples, supplementary voltage supply bus 118 may be configured to carry the electrical signal to the plurality of the first set of pixel circuits 114A in the rounded corner region 104 without increasing or only marginally increasing the thickness of the supplementary voltage supply bus 118. Notwithstanding any additional space occupied by a marginal increase in the thickness of the supplementary voltage supply bus 118, decreasing the area occupied by pixel circuit traces 119 may ultimately result in more space in the bezel region of the rounded corner region 104 for other structures commonly located in the rounded corner region 104 (e.g., SCAN and EM lines), in turn allowing for the display panel bezel size to be decreased.

Figure 1C:
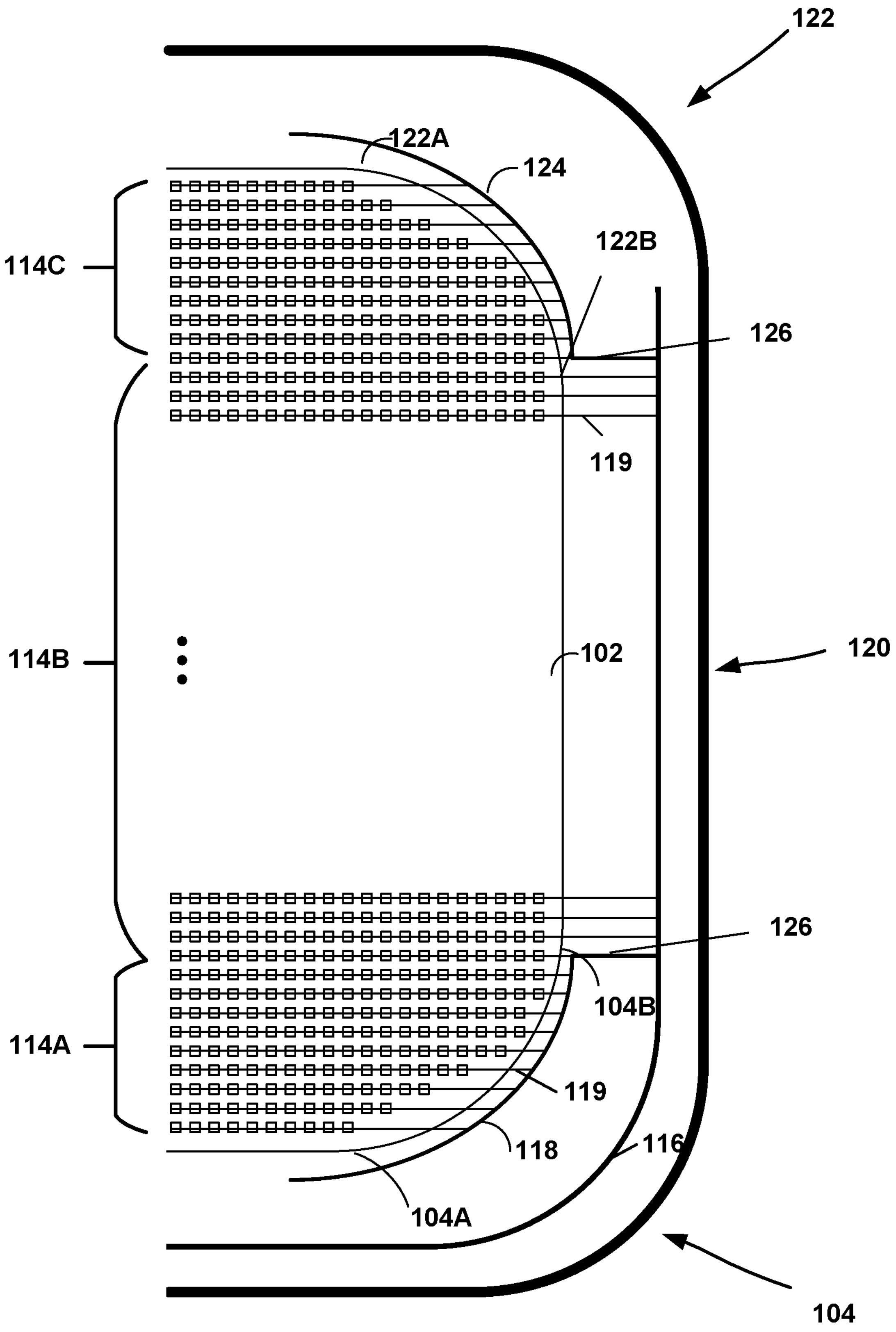
FIG. 1C is a conceptual diagram illustrating, in more detail, a display device with a plurality of rounded corner regions in accordance with aspects of this disclosure.

FIG. 1C is a diagram illustrating an enlarged example of another rounded corner region 122. As illustrated by the example of FIG. 1C, a display panel 100 may include a plurality of rounded corner regions, wherein rounded corner region 104 is a first rounded corner region, wherein rounded corner region 122 is a second rounded corner region, and wherein supplementary voltage supply bus 118 is a first supplementary voltage supply bus. As shown in the example of FIG. 1C, the second rounded corner region may be located between second side 112 and second end 108 of display panel 100. However, second rounded corner region 122 may be located between another end and another side of display panel 100 (e.g., first side 110 and second end 108), as long as the location of second rounded corner region 122 is different from the location of first rounded corner region 104.

As illustrated by the example of FIG. 1C, a display panel 100 may include a plurality of pixel circuits 114, a voltage supply bus 116, and a second supplementary voltage supply bus 124. Together, pixel circuits 114 may constitute display panel active area 102. Pixel circuits 114 may receive an initialization voltage to program emission levels of pixel circuits 124 from voltage supply bus, which may be configured to carry an electrical signal to pixel circuits 114.

Plurality of pixel circuits 114 may include a third set of pixel circuits 114C ending in second rounded corner region 122, the last pixel in first row of pixel circuits of third set of pixel circuits 114C being at a first terminal point of rounded corner 122A of rounded corner region 122, and the last pixel in last row of pixel circuits of third set of pixel circuits 114C being at a second terminal point of rounded corner 122B adjacent to the second terminal point of straight region 120, straight region 120 being adjacent to second rounded corner 122.

Second supplementary voltage supply bus 124, electrically connected to voltage supply bus 116, may be configured to carry the electrical signal to third set of pixel circuits 114C in second rounded corner region 122. By configuring second supplementary voltage supply bus 124 to carry the electrical signal to the plurality of the third set of pixel circuits 114C in the rounded corner region 122, the area occupied by pixel circuit traces 119 (e.g., connections configured to carry an electrical signal between pixel circuits 114 and voltage supply bus 116, first supplementary voltage supply bus 118 or second supplementary voltage supply bus 124) may be reduced, resulting in space in the bezel region of the rounded corner region for other structures (e.g., signal/power lines, integrated row driver circuit, etc.), in turn allowing for the display panel bezel size to be decreased. For example, voltage supply bus 116 may be electrically connected to a DC initialization voltage source, and second supplementary voltage supply bus 124 may be used to carry an electrical signal from the voltage supply bus 116 to third set of pixel circuits 114C in the rounded corner region 122 electrically connected to second supplementary voltage supply bus 124.

Figure 2:
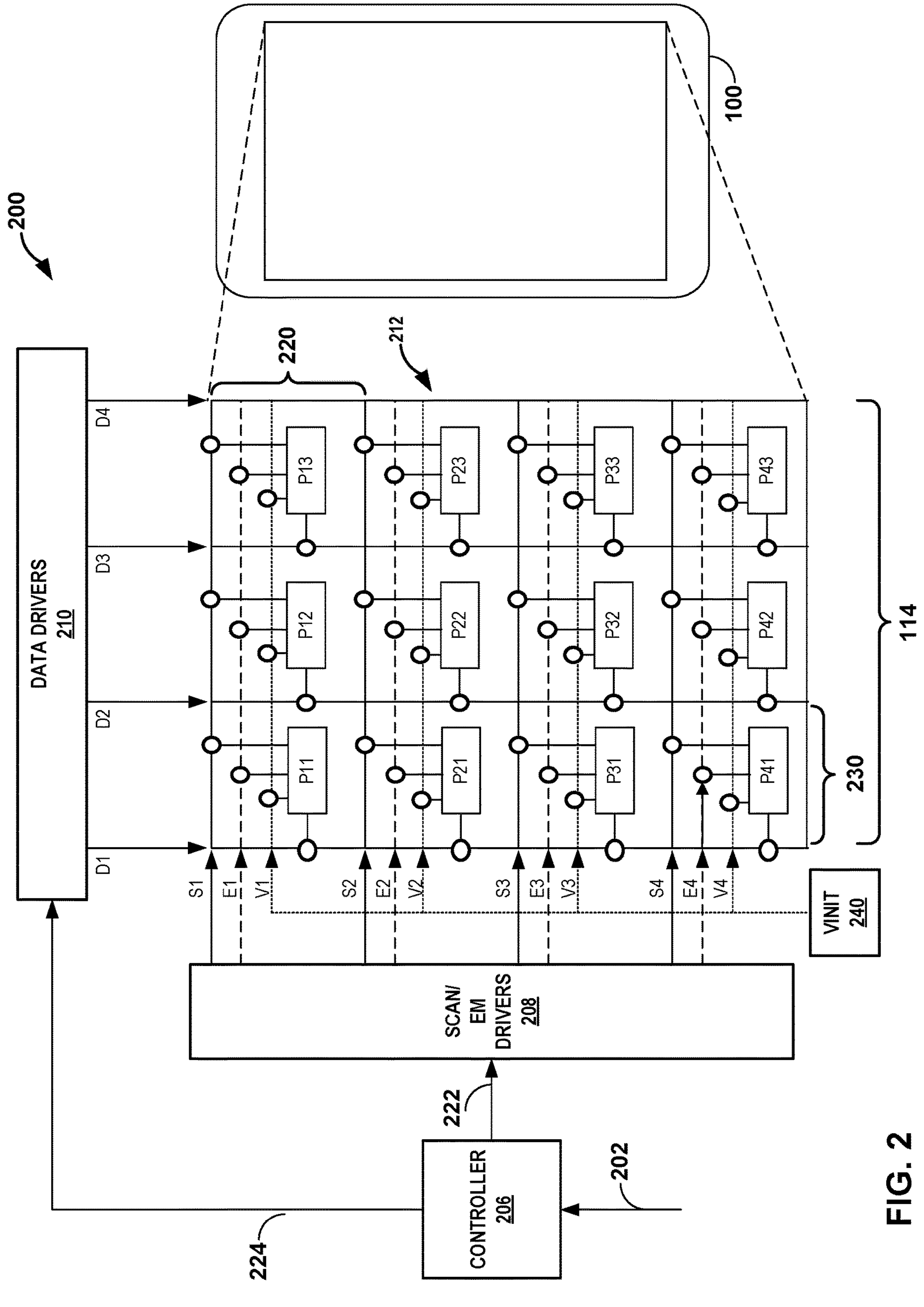
FIG. 2 is a conceptual diagram illustrating, in more detail, the display device shown in the example of FIGS. 1A, 1B, and 1C.
Figure 3:
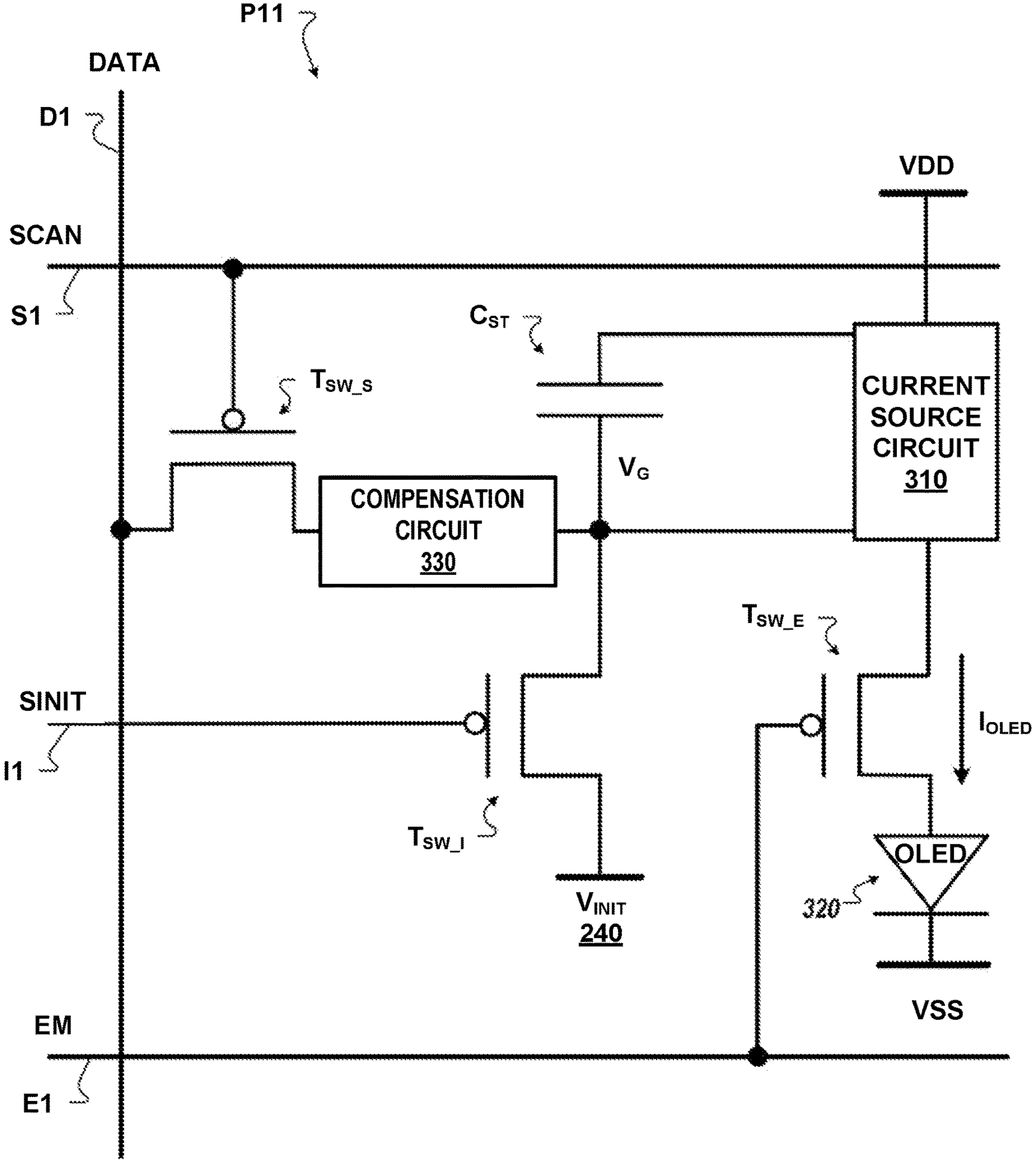
FIG. 3 is a conceptual diagram illustrating, in more detail, an example pixel circuit of a display system included in the display device shown in the example of FIG. 2.

FIG. 2 is a diagram illustrating, in more detail, the computing device shown in the example of FIGS. 1A-1C. As shown in the example of FIG. 2, display 200 may represent an example of display panel 100, where display panel 200 represents a display system that includes an array 212 of light emitting pixels. In FIG. 2 and FIG. 3, an OLED display is illustrated, wherein each light emitting pixel of OLED display 200 includes an OLED. However, as discussed above, techniques in accordance with this disclosure may also be applied to a LCD, a LED display, an AMOLED display, a microLED display, or a similar monochrome or color display capable of outputting visible information to a user of display panel 200.

Drivers, including SCAN/EM drivers 208 and data drivers 210, may drive display 200. SCAN/EM drivers 208 may be integrated, i.e., stacked, row line drivers. In some examples, SCAN/EM drivers 208 identifies a row of pixels in the display, and data drivers 210 provide data signals (e.g. voltage data) to the pixels in the selected row to cause the OLEDs to output light according to image data. Signal lines such as scan lines, EM lines, and data lines may be used in controlling the pixels to display images on the display. Though FIG. 2 illustrates display 200 as having SCAN/EM drivers 208 on one side, SCAN/EM drivers 208 may be arranged on both left and right sides of display 200 improving the driving performance (e.g. speed), compared to when such drivers are placed on only the left side or only the right side of display 200.

Display 200 includes pixel array 212 that includes a plurality of light emitting pixels, e.g., the pixels P11 through P43. A pixel is a small element on a display that can change color based on the image data supplied to the pixel. Each pixel within pixel array 212 can be addressed separately to produce various intensities of color. Pixel array 212 extends in a plane and includes rows and columns.

Each row extends horizontally across pixel array 212. For example, a first row 220 of the pixel array 212 includes pixels P11, P12, and P13. Each column extends vertically down the pixel array 212. For example, first column 230 of the pixel array 212 includes pixels P11, P21, P31, and P41. Only a subset of the pixels are shown in FIG. 2 for ease of illustration purposes and display 200 may include hundreds, thousands, or millions of pixels (and possibly more in high resolution displays). In practice, there may be several million pixels in the pixel array 212. Greater numbers of pixels can result in higher resolution.

Display 200 includes SCAN/EM drivers 208 and data drivers 210. SCAN/EM drivers supply SCAN and EM signals to rows of pixel array 212. SCAN/EM drivers 208 supply, in the example of FIG. 2, scan signals via scan lines S1 to S4, and EM signals via EM lines E1 to E4, to respective rows of pixels. Data drivers 210 supply signals to columns of pixel array 212. In the example of FIG. 2, data drivers 210 supply data signals, via data lines D1 to D4, to the columns of pixels.

Each pixel in the pixel array 212 is addressable by a horizontal scan line and EM line, and a vertical data line. For example, pixel P11 is addressable by scan line S1, EM line E1, and data line D1. In another example, pixel P32 is addressable by scan line S3, EM line E3, and data line D2.

SCAN/EM drivers 208 and data drivers 210 provide signals to the pixels enabling the pixels to reproduce the image. SCAN/EM drivers 208 and data drivers 210 provide the signals to the pixels via the scan lines, the emission lines, and the data lines. To provide the signals to the pixels, SCAN/EM drivers 208 select a scan line and control the emission operation of the pixels. Data drivers 210 provides data signals to pixels addressable by the selected scan line to light the selected OLEDs according to the image data.

The scan lines are addressed sequentially for each frame. A frame is a single image in a sequence of images that are displayed. A scan direction determines the order in which the scan lines are addressed. In display 200, the scan direction is from top to bottom of the pixel array 212. For example, scan line S1 is addressed first, followed by the scan lines S2, then S3, etc.

Display 200 includes a controller 206 that receives display input data 202. Controller 206 generates scan control signals 222 and data control signals 224 from display input data 202. Scan control signals 222 may drive SCAN/EM drivers 208. Data control signals 224 may drive the data drivers 210. Controller 206 controls the timing of the scan signals and EM signals through scan control signals 222. Controller 206 controls the timing of the data signals through the data control signals 224.

Display 200 also includes $V_{INIT}$ 240. $V_{INIT}$ 240 is an initial reference voltage and may be used to initialize or precharge pixel array 212. For example, pixel circuits 114 in pixel array 212 may receive an initialization voltage to program emission levels of pixel circuits 114. An initialization voltage source (e.g., DC voltage source) may provide, by voltage supply bus 116, $V_{INIT}$ 240 to pixel array 212 via pixel circuit traces 119 between the rows of pixel circuits 114 and the voltage supply bus. Although illustrated as separate from SCAN/EM drivers 208, $V_{INIT}$ 240 may be integrated with SCAN/EM drivers 208.

Each row of pixel circuits 114, and therefore each pixel in each row of pixel circuits 114, in pixel array 212 is addressable by $V_{INIT}$ 240. For example, pixel P11, and every other pixel in the same row as pixel P11, is addressable by $V_{INIT}$ 240 by pixel circuit trace V1. In another example, pixel P32 is connected to $V_{INIT}$ 240 by pixel circuit trace V3. In some examples, $V_{INIT}$ 240 provides a voltage to each row of pixel circuits 114 in display 200 one row at a time (e.g., row-by-row in a matrix addressing display) via pixel circuit traces, in this way initializing or precharging each pixel of every row of pixel circuits 114 in display 200.

In some examples, electrode(s) (e.g., an anode) of the display may be initialized in every frame based on $V_{INIT}$ 240. Display 200 may then emit light when a voltage difference between two electrodes (e.g., the anode and a cathode) exceeds a threshold voltage after initialization of the electrode(s). In some examples, $V_{INIT}$ 240 may initialize switching thin film transistors (TFTs), such as an initializing TFT ($T_{SW\_I}$).

FIG. 3 is a diagram illustrating, in more detail, an example pixel circuit of a display system included in the computing device shown in the example of FIG. 2. In the example of FIG. 3, pixel P11 of the display system 200 (discussed above with respect to the example of FIG. 2) is shown in more detail. Pixel P11 may represent an active matrix OLED (AMOLED) pixel. The pixel P11 is addressable by horizontal scan line S1, emission line E1, vertical data line D1, and initializing signal line I1. Pixel P11 receives a scan signal "SCAN" from scan line S1, a data voltage "DATA" from data line D1, and an emission signal "EM" from emission line E1. Pixel P11 also receives an initializing signal "SINIT" from an initial signal line I1. Pixel P11 receives power supply voltage VDD and initial reference voltage $V_{INIT}$ 240. Pixel P11 is connected to a common ground VSS.

Pixel P11 includes an organic light-emitting diode (OLED) 320. OLED 320 includes a layer of an organic compound that emits light in response to an electric current, $I_{OLED}$. The organic layer is positioned between two electrodes: an anode and a cathode. Current source circuit 310 receives the supply voltage VDD and drives OLED 320 to emit light.

Pixel P11 includes a storage capacitor $C_{ST}$. Storage capacitor $C_{ST}$ may maintain the gate voltage $V_G$ during illumination of pixel P11.

Pixel P11 also includes multiple p-channel switching TFTs. The switching TFTs include a signal TFT ($T_{SW\_S}$), an initializing TFT ($T_{SW\_I}$), and an emission TFT ($T_{SW\_E}$). In some examples, the switching TFTs can be n-channel transistors with the opposite polarity control signals.

The pixel circuit of display system 200 may include a compensation circuit 330. Compensation circuit 330 may be configured to compensate for low or high current in an electrical circuit so that current output remains within a specific current range. For example, the compensation circuit block may be configured to compensate for variations in TFT characteristics in the pixel circuits, allowing for uniform screen luminance across display panel 200.

During operation, switching TFT $T_{SW\_S}$ starts and stops the charging of the storage capacitor $C_{ST}$ based on receiving the SCAN signal from scan line S1. During an addressing period, scan line S1 turns on switching TFT $T_{SW\_S}$. Switching TFT $T_{SW\_S}$ provides the data voltage DATA from data line D1 to storage capacitor $C_{ST}$ and current source circuit 310.

Pixel P11 is programmed by the control signals: SCAN, SINIT, EM, and DATA. The OLED current, $I_{OLED}$, varies by the gate voltage $V_G$. When the gate voltage $V_G$ is steady, pixel P11 maintains a steady luminance throughout a frame time, displaying light corresponding to the supplied image data as programmed. A frame time, or frame period, is the amount of time between a start of a frame and a start of a next frame. The frame time can be the inverse of a frame rate of a display system. For example, a frame rate of 60 frames per second (fps) corresponds to a frame time of 1/60 seconds, or 0.0167 seconds.

When current source circuit 310 receives the data voltage DATA through switching TFT $T_{SW\_S}$, the current source circuit 310 provides a specified current $I_{OLED}$ to the OLED 320 based on the received data voltage DATA, such that OLED 320 emits light in accordance with the electric current $I_{OLED}$. The intensity or brightness of the emitted light depends on the amount of electrical current $I_{OLED}$ applied. A higher current can result in brighter light compared to a lower current, which results in a lower relative brightness. Thus, the intensity of the light emitted from OLED 320 is based on the data voltage DATA that corresponds to image data for the individual pixel. The storage capacitor $C_{ST}$ maintains the pixel state (e.g., stores the gate voltage level $V_G$) such that pixel P11 remains illuminated continuously after the addressing period.

Exposure to electromagnetic radiation may cause a leakage current $I_{leakage}$ to flow from storage capacitor $C_{ST}$ through TFT $T_{SW\_I}$. Leakage current $I_{leakage}$ may affect the OLED current $I_{OLED}$, causing changes to the illumination level of the pixel P11.

Although FIG. 2 and FIG. 3 illustrate example components of an OLED display, the described techniques may be applied to any panel display that includes an array of pixels. For example, the process for reducing artifacts due to electromagnetic radiation may be applied to light emitting diode (LED) panels, liquid crystal displays (LCD), and plasma display panels (PDP).

Figure 4:
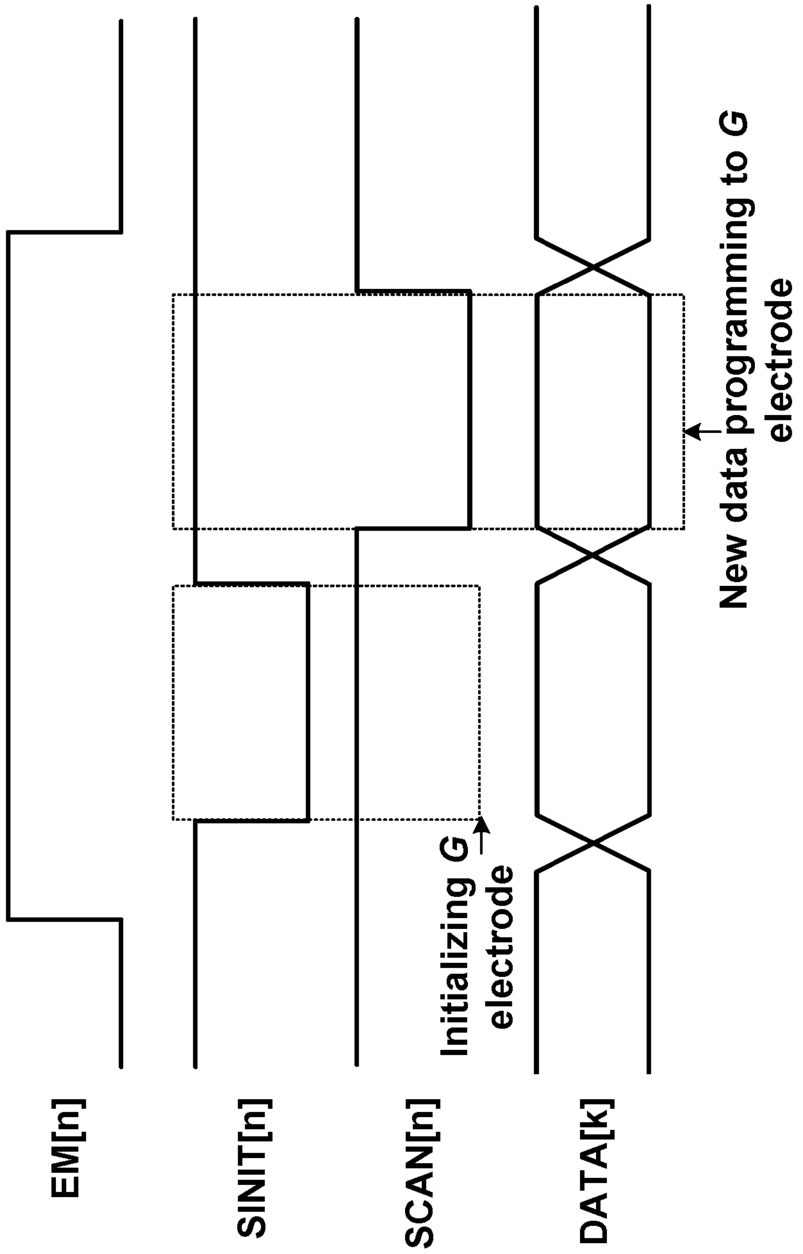
FIG. 4 is a conceptual diagram illustrating various signals of a display of a display device.

FIG. 4 is a conceptual diagram illustrating various signals of a display of a device. The signals EM[n], SINIT[n], SCAN[n], and DATA[k] of FIG. 4 may correspond to signals EM, SINIT, SCAN, and DATA from FIG. 3 for kth pixel of an nth row of pixels of a display, such as display 110. As shown in FIG. 4, during a non-emission period (e.g., when EM[n] is high), a controller (e.g., one or more processors that generate the signals EM[n], SINIT[n], SCAN[n], and DATA[k], such as controller 206 of FIG. 2) may initialize the gate voltage level $V_G$ (e.g., erased, brought to $V_{INIT}$ 240) by outputting SINIT[n] as low (e.g., where $T_{SW\_I}$ is a p-channel switch, the controller may output SINIT[n] as high to initialize the gate voltage level where $T_{SW\_I}$ is an n-channel switch) so as to open switch $T_{SW\_I}$. Following initialization, the controller may program the gate voltage level $V_G$ by opening switch $T_{SW\_S}$ by outputting SCAN[n] as low. In this way, the controller may cause a circuit to store a voltage level that represents an emissive intensity of a particular pixel. When the controller output EM[n] as low, the display may operate in an emission period in which an emitting element (e.g., 320 of FIG. 3) emits electromagnetic radiation (e.g. visible light) with an intensity based on the gate voltage level $V_G$.

Figure 5:
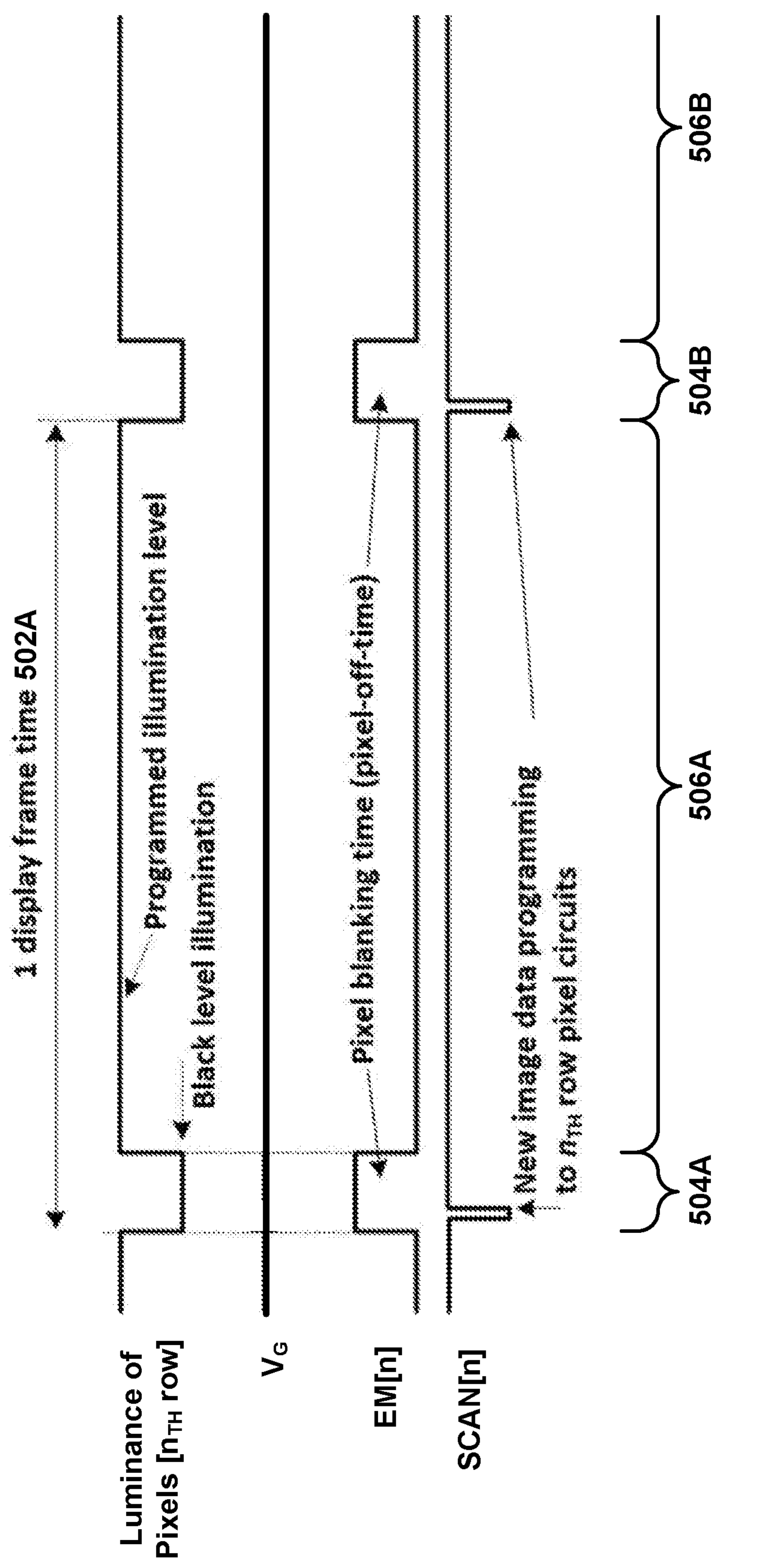
FIG. 5 is a conceptual diagram illustrating various signals of a display of a display device.

FIG. 5 is a conceptual diagram illustrating various signals of a display of a device. The signals of FIG. 5 may represent the signals of a display of a computing device, such as display system 200 of computing device of FIG. 1A. As shown in FIG. 5, operation of the display may be divided into non-emission periods 504A and 504B (collectively, "non-emission periods 504") and emission periods 506A and 506B (collectively, "emission periods 506"). As discussed above (e.g., with reference to FIG. 4), controller 206 may program gate voltage levels of pixels during non-emission periods 504 and may cause emitting elements to emit electromagnetic radiation with intensities based on their respective gate voltage levels during emission periods 506. For instance, during emission period 506A, the emitting elements may emit electromagnetic radiation at an intensity programmed during non-emission period 504A (e.g., programmed illumination level). Similarly, during emission period 506B, the emitting elements may emit electromagnetic radiation at an intensity programmed during non-emission period 504B. Non-emission periods 504 may be referred to as pixel blanking time/pixel off time. Each frame of image data may include a respective non-emission period during which the pixels are programmed, and an emission period during which the pixels emit an amount of light based on the programming.

As discussed above with reference to display panel 100 of 1A-1C, pixel circuit initialization voltage sources may be used to initialize one row at a time in a matrix addressing display, so the current driving capability of supplementary voltage supply bus 118 in such a scenario may be relatively low. Nonetheless, it may be desirable to increase the current driving capability of supplementary voltage supply bus 118, which may in turn require increasing the number of connections 126 electrically connecting supplementary voltage supply bus 118 to voltage supply bus 116.

Figure 6:
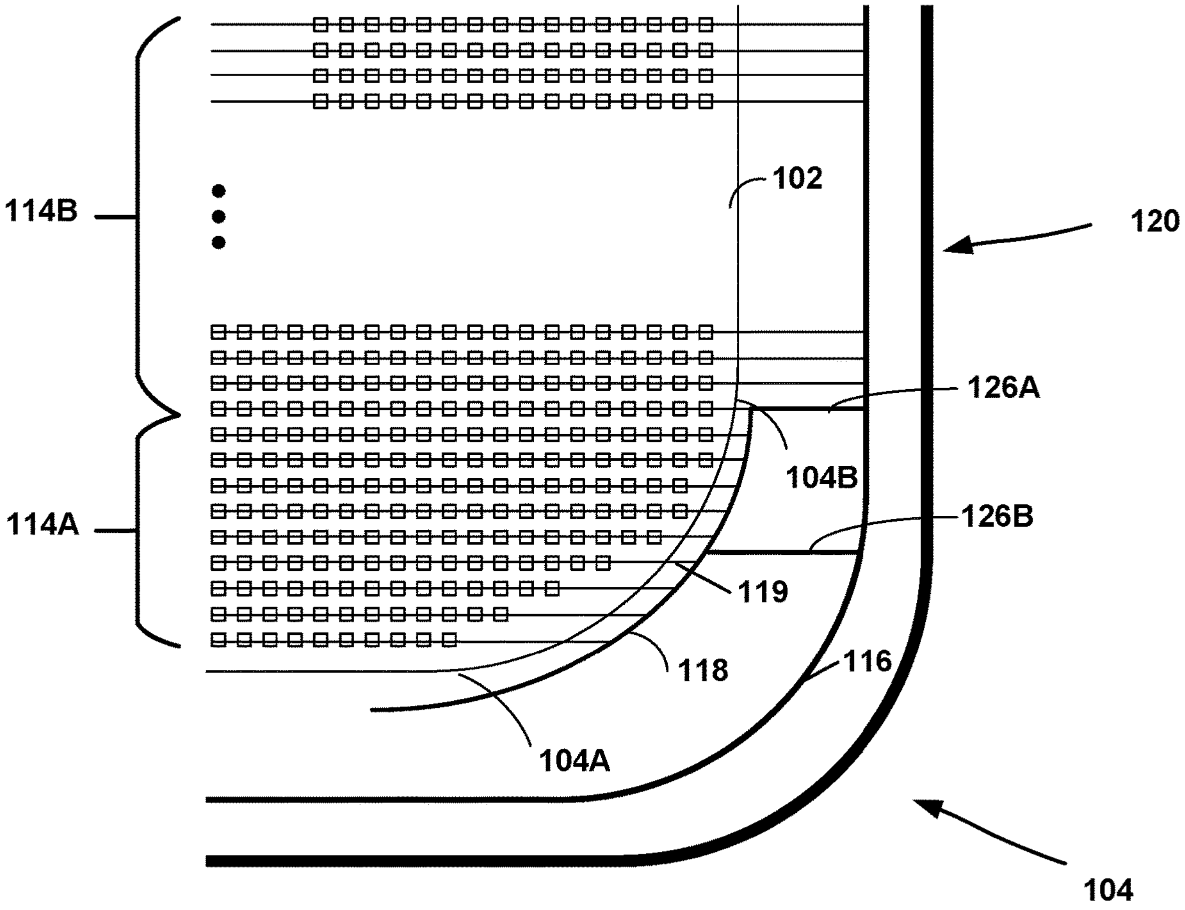
FIG. 6 is a conceptual diagram illustrating, in more detail, a display device with a rounded corner region, in accordance with one or more aspects of this disclosure.

As illustrated by the example of FIG. 6, supplementary voltage supply bus 118 may be electrically connected to voltage supply bus 116 via a first connection 126A and a second connection 126B, although it should be understood that supplementary voltage supply bus 118 may be electrically connected to voltage supply bus 116 via any number of connections 126. As discussed above, voltage supply bus 116 may be configured to carry an electrical signal along the rounded corner region 104 and the straight region 120, and supplementary voltage supply bus 118, electrically connected to the voltage supply bus 116 via first connection 126A and second connection 126B, may be configured to carry the electrical signal to the plurality of pixel circuits in the first set of pixel circuits 114A in the rounded corner region 104 electrically connected to supplementary voltage supply bus 118.

By increasing the number of connections 126, and thus the total cross-sectional surface area of connections 126, voltage loss resulting from the electrical signal being carried from the voltage supply bus 116 to supplementary voltage supply 118 may be reduced, allowing for increased current driving capability of supplementary voltage supply bus 118. Further, by increasing the number of connections 126, supplementary voltage supply bus 118 and connections 126 (e.g., first connection 126A and second connection 126B) may be configured to carry the electrical signal to the plurality of pixel circuits in the first set of pixel circuits 114A in the rounded corner region 104 in accordance with one or more techniques of this disclosure so that the area occupied by pixel circuit traces 119 is reduced. As a result, space is made available in rounded corner region 104 for relatively large structures (e.g., an initialization voltage source supply line), allowing for the reduction of display panel bezel size.

Figure 7:
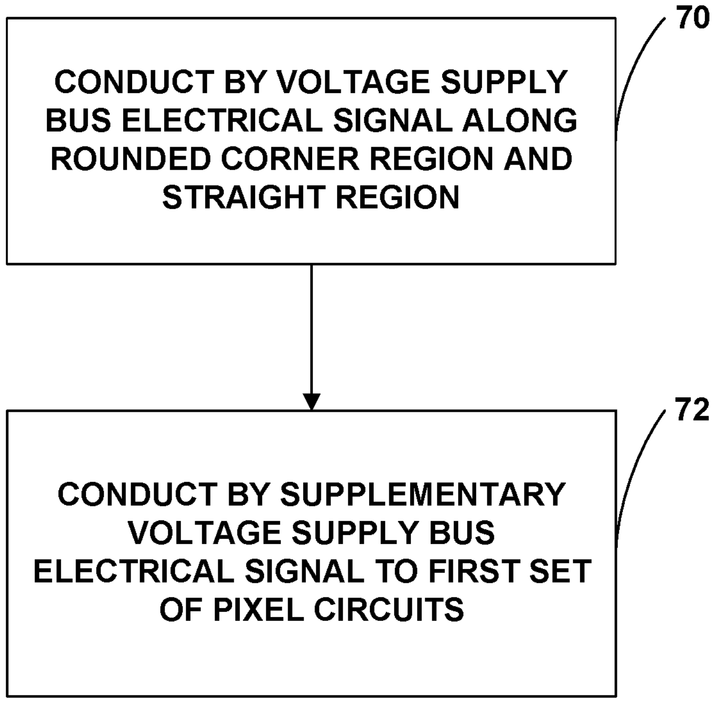
FIG. 7 is a flowchart illustrating a method of operating a display device with a rounded corner region in accordance with techniques of this disclosure.

In some examples, supplementary voltage supply bus 118 may be included in the same conducting layer as the anode electrode of display panel 100. For example, a multi-layer circuit board of display panel 100 may include an anode metal layer, and the anode metal layer may include at least a portion of the supplementary voltage supply bus. In such an example, the anode metal layer may operate as the supplementary voltage supply bus of the first set of pixel circuits as well as the anode electrode of OLED device in each pixel FIG. 7 is a flowchart illustrating a method of operating a display device with a rounded corner region, in accordance with one or more techniques of this disclosure. The techniques of FIG. 7 are discussed with reference to display panel 100 of FIGS. 1A-1C.

Voltage supply bus 116 of display panel 100 may conduct an electrical signal along rounded corner region 104 and straight region 120 of display panel 100 (70). In some examples, the electrical signal may be an initialization voltage signal (e.g., $V_{INIT}$ 240 of FIG. 3). As discussed above, one or more traces supplying the electrical signal to pixel circuits in pixel rows in a straight region (e.g., rows of pixel circuits in second set of pixel circuits 114B) may each independently and directly connect to voltage supply bus 116.

In accordance with one or more techniques of this disclosure, supplementary voltage supply bus 118 may conduct the electrical signal from voltage supply bus 116 to rows of pixel circuits in rounded corner region 104 (72). For instance, supplementary voltage supply bus 118 may conduct the initialization voltage signal from voltage supply bus 118 to a plurality of pixel circuits included in a first set of pixel circuits 114A of the plurality of pixel circuits 114. As noted above, the first set of pixel circuits 114A may end in the rounded corner region 104.

Supplementary voltage supply bus 118 may carry the electrical signal to each pixel circuit in first set of pixel circuits 114A in the rounded corner region 104. For example, supplementary voltage supply bus 118 may carry the electrical signal via pixel circuit traces 119 between pixel circuits 114A receiving the electrical signal and supplementary voltage supply bus 118. Alternatively, supplementary voltage supply bus 118 may carry the electrical signal to fewer than all the pixel circuits in first set of pixel circuits 114A in rounded corner region 104. For example supplementary voltage supply bus 118 may carry the electrical signal to only half of the pixel circuits in first set of pixel circuits 114A in rounded corner region 104 and the remaining pixel circuits in first set of pixel circuits 114A in rounded corner region 104 may receive the electrical signal directly from voltage supply bus 116. Additionally or alternatively, supplementary voltage supply bus 118 may be configured so that it possesses a curvature that allows the length of supplementary voltage supply bus 118 to be substantially adjacent to one or more pixel circuits of the first set of pixel circuits 114A that is on or near the perimeter of rounded corner region 104.

Relatively large structures (e.g., an initialization voltage source supply line) necessary for operation of the computing device may be located in a plurality of rounded corner regions of a display, which may increase display panel bezel size. In accordance with one or more aspects of this disclosure, display panels with rounded corners may accommodate the relatively large structures in the plurality of rounded corner regions of a display without significantly increasing display panel bezel size. For instance, as discussed in further detail below, display panel may include a plurality of supplementary voltage supply busses, electrically connected to the voltage supply bus, configured to carry the electrical signal to a plurality of pixel circuits in the plurality of rounded corner regions, thereby reducing the area occupied by pixel circuit traces 119 in the plurality of rounded corner regions and allowing for the reduction of display panel bezel size.

Figure 8:
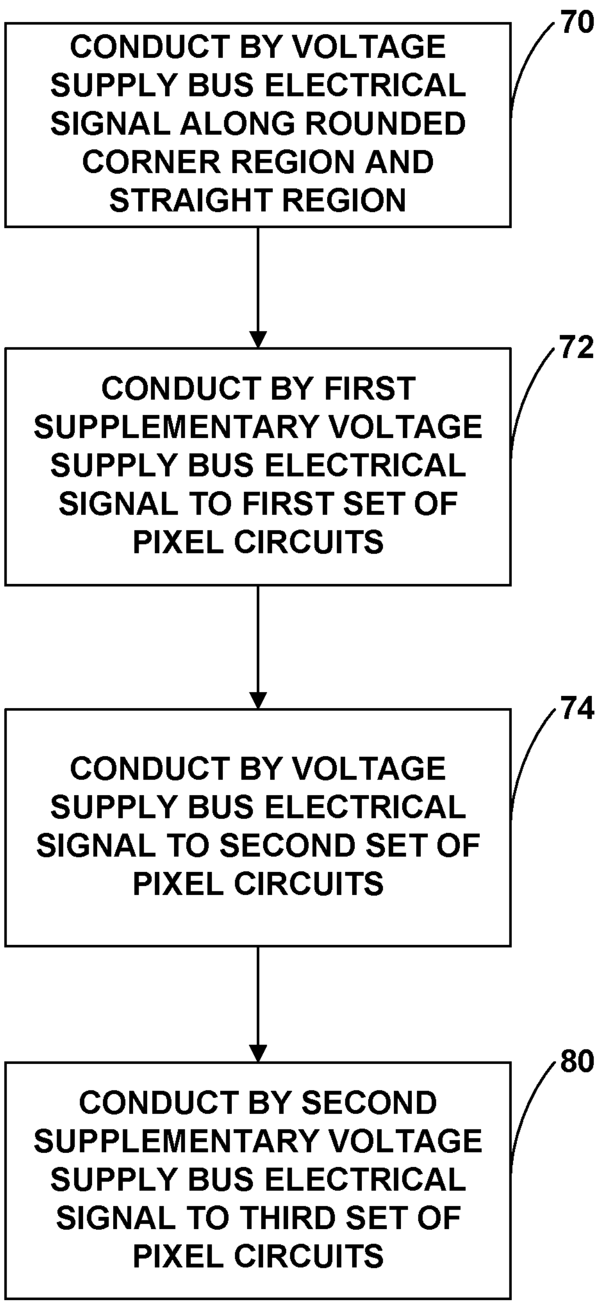
FIG. 8 is a flowchart illustrating another method of operating a display device with a rounded corner region in accordance with techniques of this disclosure.

FIG. 8 is a flowchart illustrating another method of operating a display device with a rounded corner region, in accordance with one or more techniques of this disclosure. The techniques of FIG. 8 are discussed with reference to display panel 100 of FIGS. 1A-1C, where rounded corner region 104 is first rounded corner region 104, and supplementary voltage supply bus 118 is first supplementary voltage supply bus 118.

As discussed above, voltage supply bus 116 of display panel 100 may conduct an electrical signal along first rounded corner region 104 and straight region 120 of display panel 100 (70). In accordance with one or more techniques of this disclosure, first supplementary voltage supply bus 118 may conduct the electrical signal from voltage supply bus 116 to rows of pixel circuits in first rounded corner region 104 (72). For instance, supplementary voltage supply bus 118 may conduct the initialization voltage signal from voltage supply bus 118 to a plurality of pixel circuits included in a first set of pixel circuits 114A of the plurality of pixel circuits 114. As noted above, the first set of pixel circuits 114A may end in the rounded corner region 104. Additionally, as discussed above, one or more traces supplying the electrical signal to pixel circuits in pixel rows in a straight region may each independently and directly connect to voltage supply bus 116 (74). For example, rows of pixel circuits in second set of pixel circuits 114B ending in straight region 120 adjacent to first rounded corner region 104 may each independently and directly connect to voltage supply bus 116 (74).

Second supplementary voltage supply bus 124 may carry the electrical signal to each pixel circuit in third set of pixel circuits 114C in the second rounded corner region 122 (80). For example, second supplementary voltage supply bus 124 may carry the electrical signal via pixel circuit traces 119 between pixel circuits 114C receiving the electrical signal and supplementary second voltage supply bus 124. Alternatively, second supplementary voltage supply bus 124 may carry the electrical signal to fewer than all the pixel circuits in first set of pixel circuits 114C in second rounded corner region 122. For example second supplementary voltage supply bus 124 may carry the electrical signal to only half of the pixel circuits in third set of pixel circuits 114C in second rounded corner region 122 and the remaining pixel circuits in third set of pixel circuits 114C in second rounded corner region 122 may receive the electrical signal directly from voltage supply bus 116. Additionally or alternatively, second supplementary voltage supply bus 124 may be configured so that it possesses a curvature that allows the length of second supplementary voltage supply bus 124 to be substantially adjacent to one or more pixel circuits of third set of pixel circuits 114C that is on or near the perimeter of second rounded corner region 122.

By operating a display panel to include a plurality of supplementary voltage supply busses, electrically connected to the voltage supply bus, configured to carry the electrical signal to a plurality of pixel circuits in the plurality of rounded corner regions, the area occupied by pixel circuit traces 119 in the plurality of rounded corner regions is reduced. As a result, relatively large structures (e.g., an initialization voltage source supply line) necessary for operation of the computing device may be accommodated in the plurality of rounded corner regions of the display, allowing for the reduction of display panel bezel size.

The following numbered examples may illustrate one or more aspects of this disclosure:

Example 1: A device comprising a display panel with a first end, a second end, a first side, and a second side, the display panel includes a rounded corner region located between the first end and the first side of the display panel; a plurality of pixel circuits, each pixel circuit of the plurality of pixel circuits comprising a plurality of pixels, the plurality of pixel circuits includes a first set of pixel circuits ending in the rounded corner region; and a second set of pixel circuits ending in a straight region adjacent to the rounded corner region, the straight region located on the first side of the display panel; a voltage supply bus configured to carry an electrical signal along the rounded corner region and the straight region; and a supplementary voltage supply bus, electrically connected to the voltage supply bus, configured to carry the electrical signal to the plurality of the first set of pixel circuits in the rounded corner region.

Example 2: The device of example 1, wherein the rounded corner region is a first rounded corner region, wherein the supplementary voltage supply bus is a first supplementary voltage supply bus, and wherein the device further comprises: a second rounded corner region located between the first side and the second end of the display panel, the plurality of pixel circuits further comprises a third set of pixel circuits ending in the second rounded corner region pixel circuits; and a second supplementary voltage supply bus configured to carry the electrical signal to the third set of pixel circuits in the second rounded corner region, the second supplementary voltage source bus electrically connected to the voltage supply bus.

Example 3: The device of example 1, wherein the display is an active matrix organic light emitting diode display, and wherein the electrical signal is an initialization voltage signal used to program emission levels of pixel circuits of the plurality of pixel circuits in the rounded corner region.

Example 4: The device of example 1, further comprising a display driver integrated circuit configured to output the initialization voltage signal to the voltage supply bus.

Example 5: The device of example 4, wherein the display driver integrated circuit is located proximal to the first end.

Example 6: The device of example 1, wherein display panel comprises a multi-layer circuit board comprising an anode metal layer, the anode metal layer comprising at least a portion of the supplementary voltage supply bus, and wherein the anode metal layer operates as the supplementary voltage supply bus and an anode electrode for a plurality of diodes in a respective plurality of pixels for operation of the first set of rows of pixel circuits.

Example 7: The device of example 1, wherein the supplementary voltage supply bus is connected to the voltage supply bus via a plurality of connections.

Example 8: The device of example 7, wherein a quantity of pixel circuits connected to the supplementary voltage supply bus is greater than a quantity of connections included in the plurality of connections.

Example 9: The device of example 8, wherein the quantity of pixel circuits connected to the supplementary voltage supply bus is greater than twice the quantity of connections comprised in the plurality of connections.

Example 10: The device of example 8, wherein the quantity of pixels comprised in the plurality of pixels comprised in the first set of pixel circuits ending in the rounded corner region is fewer than the quantity of pixels comprised in the plurality of pixels comprised in the second set of pixel circuits ending in a straight region adjacent to the rounded corner region.

Example 11: A method of configuring a device comprising a display panel with a first end, a second end, a first side, and a second side, wherein the display panel comprises a plurality of pixel circuits, a rounded corner region located between the first end and the first side, and a straight region adjacent to the rounded corner region located on the first side includes carrying, by a voltage supply bus, an electrical signal along the rounded corner region and the straight region; and carrying, by a supplementary voltage supply bus electrically connected to the voltage supply bus, the electrical signal to a plurality of a first set of pixel circuits comprised in the plurality of pixel circuits, the first set of pixel circuits ending in the rounded corner region.

Example 12: The method of example 11, wherein the plurality of pixel circuits further comprises a second set of pixel circuits ending in the straight region adjacent to the rounded corner region.

Example 13: The method of example 11, wherein the rounded corner region is a first rounded corner region, wherein the supplementary voltage supply bus is a first supplementary voltage supply bus, and wherein the device further comprises a second rounded corner region located between the first side and the second end of the display panel, the method further includes carrying by a second supplementary voltage supply bus electrically connected to the voltage supply bus, the electrical signal to a plurality of a third set of pixel circuits ending in the second rounded corner region.

Example 14: The method of example 11, wherein the display is an active matrix organic light emitting diode display, and wherein the electrical signal is an initialization voltage signal used to program emission levels of pixel circuits of the plurality of pixel circuits in the rounded corner region.

Example 15: The method of example 11, wherein the supplementary voltage supply bus is connected to the voltage supply bus via a plurality of connections.

What is claimed is:

1. A device comprising a display panel with a first end, a second end, a first side, and a second side, the display panel comprising:
- a rounded corner region located between the first end and the first side of the display panel;
- a plurality of rows of pixel circuits comprising:
  - a first set of rows of pixel circuits ending in the rounded corner region; and
  - a second set of rows of pixel circuits ending in a straight region adjacent to the rounded corner region, the straight region located on the first side of the display panel;
- a voltage supply bus configured to carry an electrical signal along the rounded corner region and the straight region; and
- a supplementary voltage supply bus, electrically connected to the voltage supply bus, configured to carry the electrical signal to a plurality of the first set of rows of pixel circuits in the rounded corner region, wherein the supplementary voltage supply bus is curved around the rounded corner region, and wherein the electrical signal is an initialization voltage signal used to program emission levels of pixel circuits of the plurality of rows of pixel circuits in the rounded corner region and the straight region,
- wherein the display panel further comprises straight conductors that are electrically connected to the supplementary voltage supply bus and carry the electrical signal from the supplementary voltage supply bus to pixel circuits of the plurality of the first set of rows of pixel circuits.

2. The device of claim 1, wherein the rounded corner region is a first rounded corner region, wherein the supplementary voltage supply bus is a first supplementary voltage supply bus, and wherein the device further comprises:
- a second rounded corner region located between the first side and the second end of the display panel, the plurality of rows of pixel circuits further comprises a third set of rows of pixel circuits ending in the second rounded corner region; and
- a second supplementary voltage supply bus configured to carry the electrical signal to the third set of rows of pixel circuits in the second rounded corner region, the second supplementary voltage supply bus electrically connected to the voltage supply bus.

3. The device of claim 1, further comprising a display driver integrated circuit configured to output the initialization voltage signal to the voltage supply bus.

4. The device of claim 3, wherein the display driver integrated circuit is located proximal to the first end.

5. The device of claim 1, wherein the supplementary voltage supply bus is connected to the voltage supply bus via a plurality of connections.

6. The device of claim 5, wherein a quantity of rows of pixel circuits connected to the supplementary voltage supply bus is greater than a quantity of connections included in the plurality of connections.

7. The device of claim 6, wherein the quantity of rows of pixel circuits connected to the supplementary voltage supply bus is greater than twice the quantity of connections comprised in the plurality of connections.

8. The device of claim 6, wherein the quantity of pixels comprised in the plurality of pixels comprised in the first set of rows of pixel circuits ending in the rounded corner region is fewer than the quantity of pixels comprised in the plurality of pixels comprised in the second set of rows of pixel circuits ending in a straight region adjacent to the rounded corner region.

9. A method of configuring a device comprising a display panel with a first end, a second end, a first side, and a second side, wherein the display panel comprises a plurality of rows of pixel circuits, a rounded corner region located between the first end and the first side, and a straight region adjacent to the rounded corner region located on the first side, the method comprising:

carrying, by a voltage supply bus, an electrical signal along the rounded corner region and the straight region;

carrying, by a supplementary voltage supply bus electrically connected to the voltage supply bus, the electrical signal to a plurality of a first set of rows of pixel circuits comprised in the plurality of rows of pixel circuits, the first set of rows of pixel circuits ending in the rounded corner region, wherein the supplementary voltage supply bus is curved around the rounded corner region, and wherein the electrical signal is an initialization voltage signal used to program emission levels of rows of pixel circuits of the plurality of rows of pixel circuits in the rounded corner region; and carrying, by straight conductors that are electrically connected to the supplementary voltage supply bus, the electrical signal from the supplementary voltage supply bus to pixel circuits of the plurality of the first set of rows of pixel circuits.

10. The method of claim 9, wherein the plurality of rows of pixel circuits further comprises a second set of rows of pixel circuits ending in the straight region adjacent to the rounded corner region.

11. The method of claim 9, wherein the rounded corner region is a first rounded corner region, wherein the supplementary voltage supply bus is a first supplementary voltage supply bus, and wherein the device further comprises a second rounded corner region located between the first side and the second end of the display panel, the method further comprising:

carrying by a second supplementary voltage supply bus electrically connected to the voltage supply bus, the electrical signal to a plurality of a third set of rows of pixel circuits ending in the second rounded corner region.

12. The method of claim 9, wherein the supplementary voltage supply bus is connected to the voltage supply bus via a plurality of connections.

13. The method of claim 9, further comprising outputting, by a display driver integrated circuit, the initialization voltage signal to the voltage supply bus.

14. The method of claim 13, wherein the display driver integrated circuit is located proximal to the first end.

15. The method of claim 9, wherein the supplementary voltage supply bus is connected to the voltage supply bus via a plurality of connections, and wherein a quantity of rows of pixel circuits connected to the supplementary voltage supply bus is greater than a quantity of connections included in the plurality of connections.

16. The method of claim 15, wherein the quantity of pixels comprised in the plurality of pixels comprised in the first set of rows of pixel circuits ending in the rounded corner region is fewer than the quantity of pixels comprised in the plurality of pixels comprised in the second set of rows of pixel circuits ending in a straight region adjacent to the rounded corner region.

17. The device of claim 1, wherein the supplementary voltage supply bus is connected to the voltage supply bus by only a single connection.

18. The method of claim 9, wherein the supplementary voltage supply bus is connected to the voltage supply bus by only a single connection.

* * * * *